B. A. HOLDEN.
SPRING AND SHOCK ABSORBER.
APPLICATION FILED FEB. 18, 1918.
1,290,019.
Patented Dec. 31, 1918.
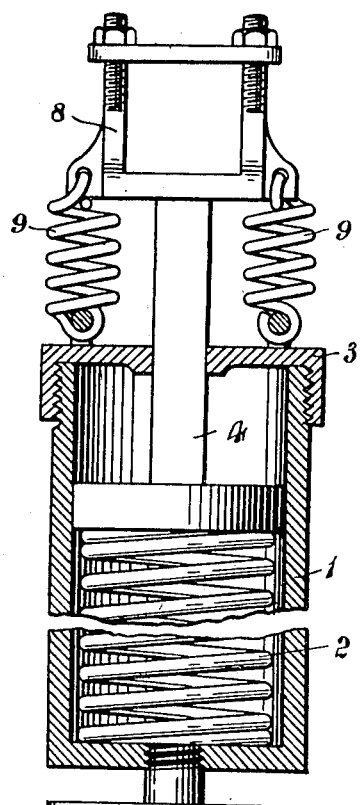
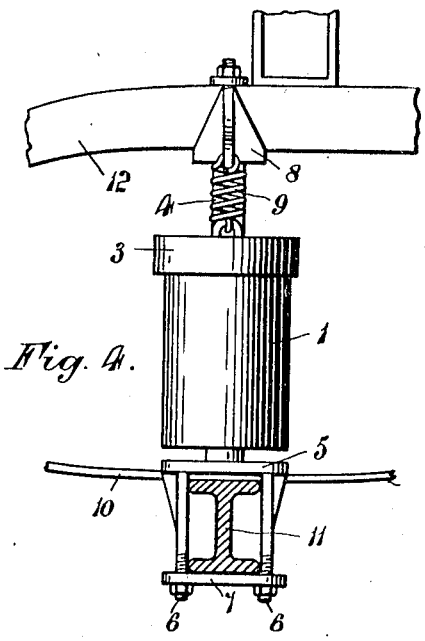
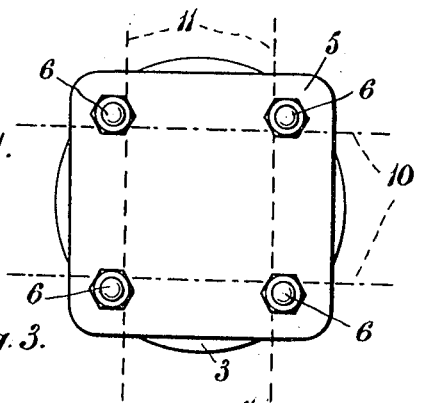
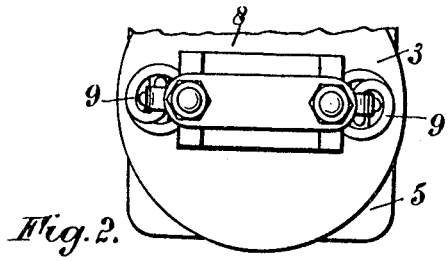
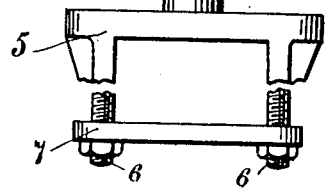
Inventor.
Bertram A. Holden
By
Stanley Lightfoot
Attorney.

UNITED STATES PATENT OFFICE.

BERTRAN A. HOLDEN, OF TORONTO, ONTARIO, CANADA.

SPRING AND SHOCK-ABSORBER.

1,290,019.  Specification of Letters Patent.  Patented Dec. 31, 1918.

Application filed February 18, 1918. Serial No. 217,813.

*To all whom it may concern:*

Be it known that I, BERTRAN A. HOLDEN, of the city of Toronto, in the county of York, in the Province of Ontario, in the Dominion of Canada, have invented certain new and useful Improvements in Springs and Shock-Absorbers, and do hereby declare that the following is a full, clear, and exact description of same.

This invention relates to spring supports for vehicles, and has for its object to provide means of support which may be used, according to conditions, either independent of or in combination with laminated or such other springs as may be provided in a vehicle, so that the device embodying this invention may be used as an attachment, where desirable, the said means being also adapted to act as a shock absorber or damper.

Further objects subsidiary to or resulting from the main objects above mentioned or from the construction and operation of the invention as it may be carried into effect will become apparent as the said invention is hereinafter further disclosed.

In carrying the said invention into effect I may provide resilient means, such as a spring, adapted to be located upon the axle or such other part of the vehicle upon which the body of the same is to be resiliently mounted, and a supporting member, for the said vehicle body, to rest upon the said spring and move vertically therewith, together with further resilient means, such as a spring, or springs, extending between and connected directly or indirectly to the axle at their lower ends and to the vehicle body at their upper ends, the said last-mentioned spring, or springs, being normally tensioned or exerting a downward pull upon said vehicle body, whereby downward movement of the vehicle body will be assisted by the last-mentioned spring, or springs, but the upward movement of the said vehicle body, due to reaction of the first-mentioned spring, retarded or damped by the said second-mentioned springs; all of which is more particularly described and ascertained hereinafter, having reference to the example illustrated in the accompanying drawing, in which:

Figure 1 is a sectional elevation of a spring device constructed in accordance with this invention;

Fig. 2 is a plan of the same;

Fig. 3 is a plan of underside of the same, and

Fig. 4 is an elevation showing the device applied to a vehicle.

Similar characters of reference indicate similar parts in the several figures of the drawing.

1 is a hollow cylindrical casing inclosing a spring 2, (hereinafter called the "main spring"), 3 being a cover plate or cap closing the upper end of the said casing and having an orifice therein in which a plunger 4 is slidably accommodated, the said plunger being adapted at its lower end to rest upon the upper end of the main spring 2, whereby the sliding of the said plunger 4 will be resultant upon, or result in, the expansion or compression of the said main spring.

The casing may be attached to the axle, or other such desirable part, of a vehicle by means of a saddle or clip 5, which may be detachable from the said casing, the form of clip shown in the drawing having four bolts 6, 6, to receive a plate 7 adapted to extend underneath the axle, as will be well understood.

The vehicle body may be supported on the upper end of the plunger 4 by being connected thereto, such as by a clip 8, so that when the device is applied to a vehicle as shown in Fig. 4, that part of the weight of the vehicle which the device is intended to support will be supported by the said main spring 2.

9. 9 are springs connected at their lower ends to the cap 3, and at their upper ends to the clip 8, the said springs being normally tensioned, whereby they exert a downward pressure on the said plunger against the action of the main spring 2. The said springs 9, 9 are hereinafter called the "damping springs."

Where convenient the device described may be applied to a vehicle without being assisted by other springs, such as laminated springs, although it will be understood that a plurality of such devices may generally be used, but the said device may be used in combination with such other springs, as for instance, by being positioned between the laminated spring and the vehicle body; and in Fig. 4 a plate spring 10 is shown, which, of course, may be laminated or otherwise, crossing an axle 11 to which the device is applied and taking strains lateral to the said device.

It will be understood that with the device, heavily built-up laminated springs would not be essential in most cases, and therefore the cheaper single plate spring as shown in the drawing could be used where such a transverse spring is desired.

In the plan of underside shown in Fig. 3, the position of the axle is indicated by the dotted lines 11, and the position of the spring 10 transverse thereto indicated by the dotted lines 10.

The four-bolt construction of lower clip as illustrated makes the device very adaptable to use in this manner.

12 represents one of the side members of the frame of the vehicle body.

In operation, when the vehicle to which this device is applied passes over an obstacle, the main spring 2 is compressed, while the tension of the damping springs 9, 9 is decreased, and upon the reaction of the main spring 2, the damping springs 9, 9 are again tensioned, tending to decrease the amplitude of the reactive movement of the said main spring, and thus reduce the objectionable "bounce" which would otherwise result; and where the parts are arranged in the relative positions shown, the forces are oppositely disposed and act vertically, permitting of a light and convenient construction.

This invention may be developed within the scope of the following claims without departing from the essential features of the said invention, and it is desired that the specification and drawing be read as being merely illustrative and not in a limiting sense except as necessitated by the prior art.

What I claim as my invention is:—

1. In a device of the class described a casing adapted to be secured to the axle of the vehicle, a supporting spring within said casing, a plunger resting upon said supporting spring and adapted to be secured to the body of such vehicle, and damping springs secured at their lower ends to the said casing and at their upper ends to the said plunger, said damping springs being normally in a state of tension.

2. In combination with a vehicle having an axle, a plate spring extending across the said axle and a body, a casing, means whereby said casing may be secured to the said axle in proximity to the junction of said plate spring therewith, a main spring carried by said casing, a plunger supported by said main spring and connected to said vehicle body, and damping springs in a normal state of tension connected to said casing and to said plunger to exert a downward force thereon.

Signed at the city of Toronto, in the county of York, in the Province of Ontario, in the Dominion of Canada, this 8th day of February, 1918.

BERTRAN A. HOLDEN.

Copies of this patent may be obtained for five cents each, by addressing the "Commissioner of Patents, Washington, D. C."